United States Patent
Moulsley et al.

(10) Patent No.: US 6,611,690 B1
(45) Date of Patent: Aug. 26, 2003

(54) RADIO COMMUNICATION SYSTEM

(75) Inventors: Timothy J. Moulsley, Caterham (GB); Bernard Hunt, Redhill (GB); Matthew P. J. Baker, Canterbury (GB)

(73) Assignee: Koninklijke Philips Electronics N.V., Eindoven (NL)

( * ) Notice: Subject to any disclaimer, the term of this patent is extended or adjusted under 35 U.S.C. 154(b) by 0 days.

(21) Appl. No.: 09/571,457

(22) Filed: May 16, 2000

(30) Foreign Application Priority Data

May 26, 1999 (GB) .............................. 9912289
Jul. 2, 1999 (GB) .............................. 9915571

(51) Int. Cl.$^7$ ................................ H04B 7/00
(52) U.S. Cl. ......................... 455/522; 455/69
(58) Field of Search .................. 455/522, 69, 442, 455/443, 432; 370/318, 332, 333, 311, 328, 329

(56) References Cited

U.S. PATENT DOCUMENTS

| | | | |
|---|---|---|---|
| 5,056,109 A | 10/1991 | Gilhousen et al. | 375/1 |
| 5,844,894 A | 12/1998 | Dent | 370/330 |
| 5,924,043 A * | 7/1999 | Takano | 455/522 |
| 6,351,651 B1 * | 2/2002 | Hamabe et al. | 455/522 |

FOREIGN PATENT DOCUMENTS

| | | | | |
|---|---|---|---|---|
| EP | 0458158 A3 | 11/1991 | ............ | H04Q/7/04 |
| EP | 0458158 A2 | 11/1991 | ............ | H04Q/7/04 |
| WO | WO9726716 | 7/1997 | ............ | H04B/7/005 |
| WO | 9816029 A2 | 4/1998 | | |
| WO | 9816029 A3 | 4/1998 | ............ | H04B/7/26 |

* cited by examiner

*Primary Examiner*—Nay Maung
*Assistant Examiner*—Tu Nguyen
(74) *Attorney, Agent, or Firm*—Kevin Simons

(57) ABSTRACT

In a radio communication system having a primary station and a plurality of secondary stations, the power of uplink and downlink channels between the primary station and a secondary station is controlled in a closed loop manner by each station transmitting power control commands to the other station. In response to these commands the receiving station adjusts its output power in steps. By combining a plurality of received power control commands before adjusting its output power the receiving station may emulate the ability to use a smaller power control step size than its minimum, thereby improving performance under certain channel conditions. In one embodiment when the required power control step size is less than the minimum step size of a particular station, that station processes a group of power control commands to determine whether to adjust its output power by its minimum step size. In an alternative embodiment the power control step size is fixed when the combining algorithm is used. The invention is applicable to power control in both primary and secondary stations.

14 Claims, 2 Drawing Sheets

RADIO COMMUNICATION SYSTEM

The present invention relates to a radio communication system and further relates to a secondary station for use in such a system and to a method of operating such a system. While the present specification describes a system with particular reference to the emerging Universal Mobile Telecommunication System (UMTS), it is to be understood that such techniques are equally applicable to use in other mobile radio systems.

There are two basic types of communication required between a Base Station (BS) and a Mobile Station (MS) in a radio communication system. The first is user traffic, for example speech or packet data. The second is control information, required to set and monitor various parameters of the transmission channel to enable the BS and MS to exchange the required user traffic.

In many communication systems one of the functions of the control information is to enable power control. Power control of signals transmitted to the BS from a MS is required so that the BS receives signals from different MS at approximately the same power level, while minimising the transmission power required by each MS. Power control of signals transmitted by the BS to a MS is required so that the MS receives signals from the BS with a low error rate while minimising transmission power, to reduce interference with other cells and radio systems. In a two-way radio communication system power control may be operated in a closed or open loop manner. In a closed loop system the MS determines the required changes in the power of transmissions from the BS and signals these changes to the BS, and vice versa. In an open loop system, which may be used in a TDD system, the MS measures the received signal from the BS and uses this measurement to determine the required changes in the transmission power.

An example of a combined time and frequency division multiple access system employing power control is the Global System for Mobile communication (GSM), where the transmission power of both BS and MS transmitters is controlled in steps of 2 dB. Similarly, implementation of power control in a system employing spread spectrum Code Division Multiple Access (CDMA) techniques is disclosed in U.S. Pat. No. 5,056,109.

In considering closed loop power control it can be shown that for any given channel conditions there is an optimum power control step size which minimises the required $E_b/N_0$ (energy per bit/noise density). When the channel changes very slowly the optimum step size can be less than 1 dB, since such values are sufficient to track changes in the channel while giving minimal tracking error. As the Doppler frequency increases, larger step sizes give better performance, with optimum values reaching more than 2 dB. However, as the Doppler frequency is further increased there comes a point where the latency (or update rate) of the power control loop becomes too great to track the channel properly and the optimum step size reduces again, perhaps to less than 0.5 dB. This is because the fast channel changes cannot be tracked so all that is needed is the ability to follow shadowing, which is typically a slow process.

Because the optimum power control step size can change dynamically it may improve performance if the BS instructs the MS which value of power control step size it should use in uplink transmissions to the BS. An example of a system which may use such a method is the UMTS Frequency Division Duplex (FDD) standard, where power control is important because of the use of CDMA techniques. Although improved performance can be obtained by having a small minimum step size, for example 0.25 dB, this will significantly increase the cost of a MS. However, if a MS does not have to implement the minimum step size then it may not be able to implement the step size requested by the BS.

An object of the present invention is to enable accurate power control without requiring all mobile stations to implement the same minimum power control step size.

According to a first aspect of the present invention there is provided a radio communication system comprising a primary station and a plurality of secondary stations, the system having a communication channel between the primary station and a secondary station, one of the primary and secondary stations (the transmitting station) having means for transmitting power control commands to the other station (the receiving station) to instruct it to adjust its output transmission power in steps, wherein the receiving station has combining means for processing a plurality of power control commands to determine whether to adjust its output power.

According to a second aspect of the present invention there is provided a primary station for use in a radio communication system having a communication channel between the primary station and a secondary station, the primary station having means for adjusting its output transmission power in steps in response to power control commands transmitted by the secondary station, wherein combining means are provided for processing a plurality of power control commands to determine whether to adjust its output power.

According to a third aspect of the present invention there is provided a secondary station for use in a radio communication system having a communication channel between the secondary station and a primary station, the secondary station having means for adjusting its transmission power in steps in response to power control commands transmitted by the primary station, wherein combining means are provided for processing a plurality of power control commands to determine whether to adjust its output power.

According to a fourth aspect of the present invention there is provided a method of operating a radio communication system comprising a primary station and a plurality of secondary stations, the system having a communication channel between the primary station and a secondary station, the method comprising one of the primary and secondary stations (the transmitting station) transmitting power control commands to the other station (the receiving station) to instruct it to adjust its power in steps, wherein the receiving station processes a plurality of power control commands to determine whether to adjust its output transmission power.

The present invention is based upon the recognition, not present in the prior art, that emulation of small power control step sizes by a MS can provide good performance.

Embodiments of the present invention will now be described, by way of example, with reference to the accompanying drawings, wherein.

Figure 1:
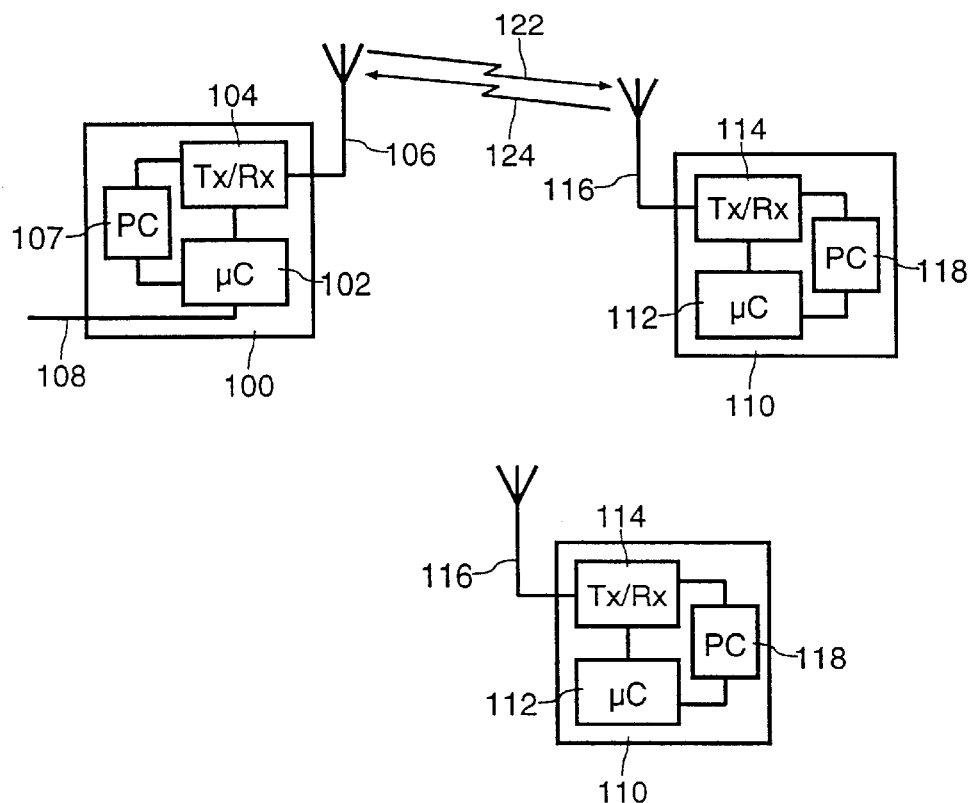
FIG. 1 is a block schematic diagram of a radio communication system.

Referring to FIG. 1, a radio communication system which can operate in a frequency division duplex or time division duplex mode comprises a primary station (BS) 100 and a plurality of secondary stations (MS) 110. The BS 100 comprises a microcontroller (μC) 102, transceiver means (Tx/Rx) 104 connected to radio transmission means 106, power control means (PC) 107 for altering the transmitted power level, and connection means 108 for connection to the PSTN or other suitable network. Each MS 110 comprises a microcontroller (μC) 112, transceiver means (Tx/Rx) 114 connected to radio transmission means 116, and power control means (PC) 118 for altering the transmitted power level. Communication from BS 100 to MS 110 takes place on a downlink channel 122, while communication from MS 110 to BS 100 takes place on an uplink channel 124.

In a UMTS FDD system data is transmitted in 10 ms frames each having 15 time slots. The BS 100 transmits one power control command (consisting of two bits) per slot, where bits 11 (referred to hereinafter for simplicity as a value of 1) requests the MS 110 to increase its power and bits 00 (referred to hereinafter as 0) requests the MS 110 to decrease its power. Changes in the required power control step size are notified separately over a control channel.

In a system according to the present invention this behaviour is modified when the MS 110 is requested to implement a power control step size smaller than the smallest of which it is capable. In this situation the MS 110 takes no action unless it receives a series of identical power control commands, thereby emulating the performance of a MS 110 having more precise power control.

Consider for example the case where the requested step size is 0.5 dB and the minimum step size implemented by the MS 110 is 1 dB. The MS 110 processes power control commands in pairs and only changes its output power if both commands are equal. Hence if the received commands are 11 the power is increased, if they are 00 the power is decreased, and if they are either 10 or 01 the power is not changed. It is advantageous to align the comparison with the transmission of frames, hence to combine the power control commands transmitted in slots 1 and 2 of a frame, then the commands transmitted in slots 3 and 4, and so on.

Similarly, if the requested step size is 0.25 dB and the minimum step size is 1 dB the MS 110 processes power control commands four at a time, and only changes its output power if all four commands are equal. Hence the power is increased if the received commands are 1111, decreased if they are 0000, and unchanged otherwise. Again it is advantageous to align the comparison with the frame transmission, combining the commands transmitted in slots 1 to 4, then the commands transmitted in slots 5 to 8 and so on.

Combining the commands received in three or five slots is particularly advantageous in the UMTS embodiment being considered because it maintains alignment with a frame of 15 slots. However, the method is not restricted to such a system. Consider a general case where the minimum step size implemented by the MS 110 is S and the step size requested by the BS 100 is R. In this case the power control commands may be combined in groups of G, where G=S/R.

Figure 2:
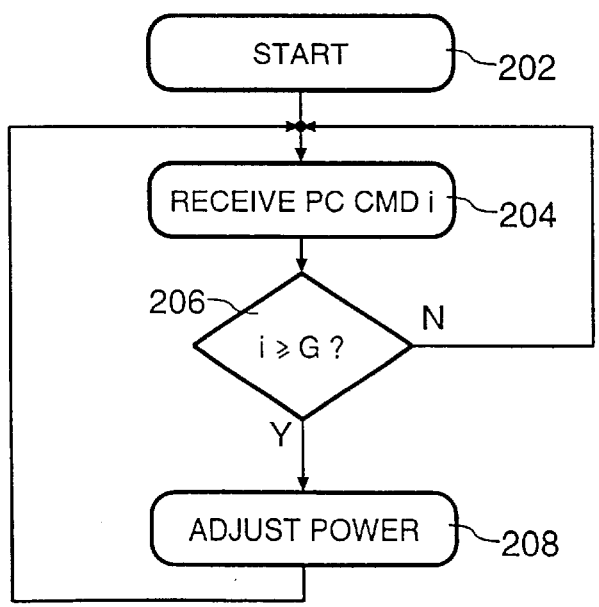
FIG. 2 is a flow chart illustrating a method in accordance with the present invention for performing power control in a secondary station.

FIG. 2 illustrates a method of emulating smaller power control steps than the minimum of the MS 110. The method starts, at 202, with the MS 110 determining G, the number of commands to be combined in a group and setting a received power control command counter i to zero. At 204 the MS 110 receives a power control command and increments the counter i. Next, at 206, the value of i is compared with G. If i is less than G then the received command is stored and the MS 110 waits to receive the next command. Otherwise the required number of power control commands have been received and the MS 110 determines, at 208, if it should adjust its power based on the received power control commands. Once this has been done the counter i is reset to zero (if i is equal to G) or to one (if i is greater than G, which will happen if G is not integer) and the MS 110 waits to receive the next power control command.

In an alternative embodiment, instead of combining power control commands in groups of G the MS 110 keeps a running total of the requested power change and makes a change once the total requested power change reaches its minimum step size. For example, if the requested step size is 0.25 dB and the minimum step size is 1 dB the sequence of received commands 11010111 would result in the power being increased by 1 dB. The MS 110 then subtracts the step actually implemented from the running total of the requested power change. However, such a scheme is more complex to implement (since it requires maintaining a running total of the requested power change) and it appears to provide only a minimal improvement to the performance of the method.

In a variation of this alternative embodiment, the MS 110 uses a soft decision method in keeping a running total of the requested power change, instead of taking a hard decision on each individual power control command. Each power control command is weighted by a function of the amplitude of the received signal for that command, as a measure of the likelihood of the MS 110 having correctly interpreted the command, before being added to the running sum. For example, the sequence 11010111011 might, once weighted, correspond to the sequence of requested power changes 0.8 0.3 −0.3 0.4 −0.1 0.5 0.9 0.8 −0.4 0.7 0.5 (in units of 0.25 dB). This sequence has a running sum of 4.1 which would trigger the MS 110 to execute an upwards step of 1 dB and to reduce the running sum to 0.1. This variation should provide a slight improvement in the performance of the method.

Two simulations have been carried out to illustrate the effectiveness of the method according to the present invention. These examine the performance of a MS 110 having a minimum step size of 1 dB compared with that of a MS 110 having a minimum step size of 0.25 dB. The simulations make a number of idealising assumptions:
- there is a 1 slot delay in the power control loop;
- there is no channel coding;
- there is perfect channel estimation by the receiver;
- equalisation in the receiver is carried out by a perfect RAKE receiver;
- no control channel overhead is included in the $E_b/N_0$ figures;
- there is a fixed error rate in the transmission of power control commands; and
- the channel is modelled as a simple N-path Rayleigh channel.

Figure 3:
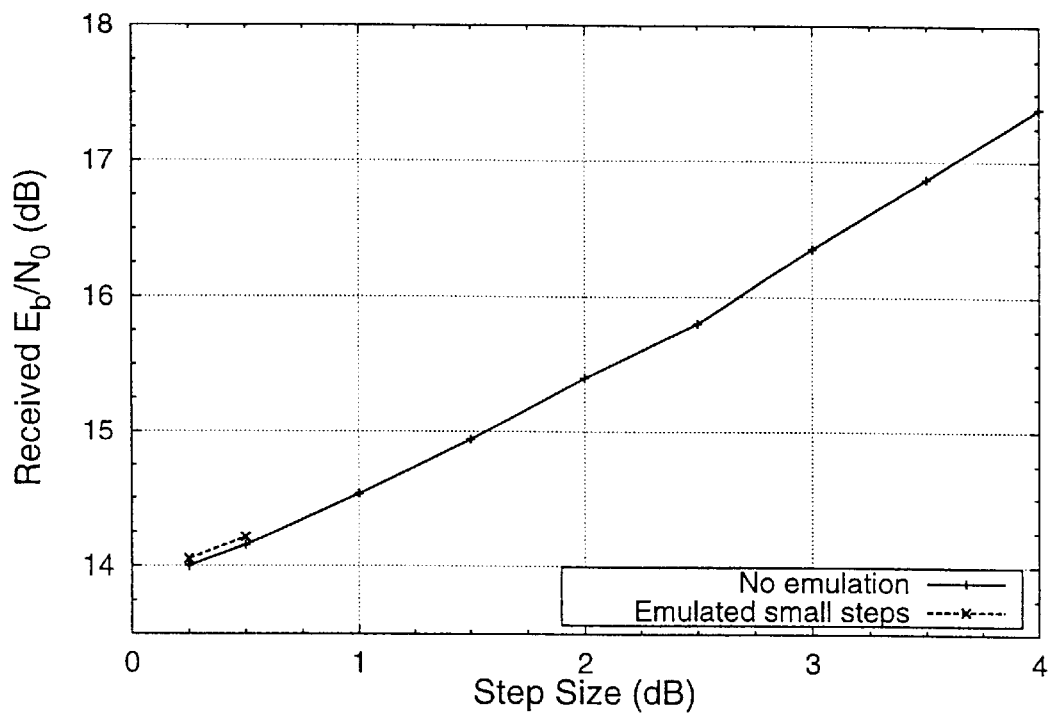
FIG. 3 is a graph of the received $E_b/N_0$ in dB required for a bit error rate of 0.01 against the power control step size used in dB for a MS moving at 300 km per hour.

The first simulation relates to a rapidly changing channel, with a MS 110 moving at 300 km per hour in a single path Rayleigh channel with an error rate for the power control commands of 0.01. FIG. 3 is a graph of the received $E_b/N_0$ in dB required for an uplink bit error rate of 0.01 against the power control step size used in dB. The solid line indicates results for a MS 110 having a minimum power control step size of 0.25 dB or less, while the dashed line indicates results for a MS 110 having a minimum step size of 1 dB which combines power control bits in groups of two or four to emulate 0.5 dB and 0.25 dB power control step sizes respectively.

In this situation the best performance is obtained for small step sizes of less than 1 dB. Emulation of 0.25 dB and 0.5 dB steps results in a small implementation loss of only about 0.05 dB, compared to about 0.6 dB if no emulation is performed, demonstrating the usefulness of the emulation method. Increasing the error rate of the power control commands to 0.1 produces a general degradation of about 0.2 dB in the received $E_b/N_0$, but the performance of the MS 110 with emulated small steps remains close to that of the MS 110 with direct implementation of small steps.

Figure 4:
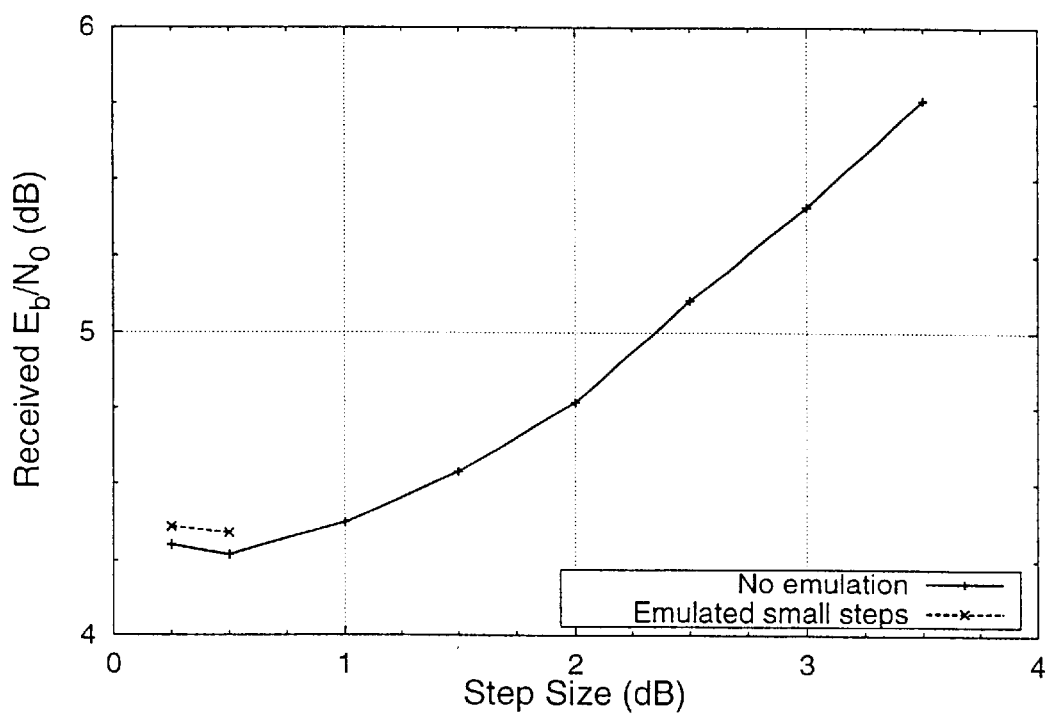
FIG. 4 is a graph of the received $E_b/N_0$ in dB required for a bit error rate of 0.01 against the power control step size used in dB for a MS moving at 1 km per hour.

The second simulation relates to a slowly changing channel, with a MS 110 moving at 1km per hour in a six path Rayleigh channel with a error rate for the power control commands of 0.01. FIG. 4 is a graph of received $E_b/N_0$ in dB required for a uplink bit error rate of 0.01 against the power control step size used in dB. The lines in the graph are identified in the same way as for FIG. 3.

In this situation there is a small advantage in using power control steps of less than 1 dB. As with the first simulation, the results obtained using emulated small steps are very close to those with direct implementation of small steps.

In a further application of this method the value of G may be set to a value other than S/R if it is considered to be advantageous for reasons such as reducing the effect of errors in the interpretation of the transmitted power control commands (for example by averaging over a greater time period). In some circumstances a MS 110 might therefore choose to use a step size larger than the minimum which it is capable of implementing.

The detailed description above relates to a system where the BS 100 transmits power control commands separately from instructions to the MS 110 to set its power control step size. However, the present invention is suited for use in a range of other systems. In particular, it can be used in any system in which there is a variable power control step size and in which the BS 100 instructs the MS 110 to use a particular value for this step. It can also be used in systems in which the power control step size is fixed, or at least fixed while a power control step size emulation method is being used. Instead of the BS 100 instructing the MS 110 to use a particular step size, that to be used could also be determined by negotiation between the BS 100 and MS 110.

Further, although the description above relates to emulation of power control step sizes by a MS 110, such a method could equally well be employed in a BS 100 for controlling the power of the downlink transmission.

From reading the present disclosure, other modifications will be apparent to persons skilled in the art. Such modifications may involve other features which are already known in radio communication systems, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

What is claimed is:

1. A radio communication system comprising a primary station and a plurality of secondary stations, the system having a communication channel between the primary station and a secondary station, one of the primary and secondary stations (the transmitting station) having means for transmitting power control commands to the other station (the receiving station) to instruct it to adjust its output transmission power in steps, wherein the receiving station has combining means that is operative if a step size requested by the transmitting station is less than a minimum step size supported by the receiving station for processing a plurality of power control commands in a sequence such that its output power is adjusted by the minimum available step size if a sum of the sequence of power control commands multiplied by the requested step size is greater than or equal to the minimum available step size, and its output power is not adjusted if the sum of the sequence of power control commands multiplied by the requested step size is less than the minimum available step size.

2. A primary station for use in a radio communication system having a communication channel between the primary station and a secondary station, the primary station having means for adjusting its output transmission power in steps in response to power control commands transmitted by the secondary station, wherein the primary station has combining means that is operative if a step size requested by the secondary station is less than a minimum step size supported by the primary station for processing a plurality of power control commands in a sequence such that output power of the primary station is adjusted by the minimum available step size if a sum of the sequence of power control commands multiplied by the requested step size is greater than or equal to the minimum available step size, and output power of the primary station is not adjusted if the sum of the sequence of power control commands multiplied by the requested step size is less than the minimum available step size.

3. A secondary station for use in a radio communication system having a communication channel between the secondary station and a primary station, the secondary station having means for adjusting its transmission power in steps in response to power control commands transmitted by the primary station, wherein the secondary station has combining means that is operative if a step size requested by the primary station is less than a minimum step size supported by the secondary station for processing a plurality of power control commands in a sequence such that output power of the secondary station is adjusted by the minimum available step size if a sum of the sequence of power control commands multiplied by the requested step size is greater than or equal to the minimum available step size, and output power of the secondary station is not adjusted if the sum of the sequence of power control commands multiplied by the requested step size is less than the minimum available step size.

4. A secondary station as in claim 3, characterized in that means are proved for process the sequence of power control commands together, the size of the sequence being determined by the minimum available step size and the requested step size.

5. A secondary station as claimed in claim 4, characterized in the size of the sequence is equal to the ratio between the minimum available step size and the requested step size.

6. A secondary station as in claim 3, characterized in that the combining means are operative in response to commands issued by the primary station to process the sequence of power control commands together and in that the size of the sequence is predetermined.

7. A secondary station as in claim 6, characterized in that the requested and the available power control step sizes are predetermined.

8. A method of operating a radio communication system comprising a primary station and a plurality of secondary stations, the system having a communication channel between the primary station and a secondary station, the method comprising one of the primary and secondary stations (the transmitting station) transmitting power control commands to the other station (the receiving station) to instruct it to adjust its power in steps, wherein if a step size requested by the transmitting station is less than a minimum step size supported by the receiving station, the receiving station processes a plurality of power control commands in a sequence such that its output transmission power is adjusted by the minimum available step size if a sum of the power control commands in the sequence multiplied by the required step size is greater than or equal to the minimum available step size, and its output power is not adjusted if the sum of the power control commands in the sequence multiplied by the required step size is less than the minimum available step size.

9. A method as in claim 8, characterized by the receiving station processing the sequence of power control commands together, and determining the size of the sequence depending on the minimum available step size and the requested step size.

10. A method as claimed in claim 9, characterized by the size of the sequence being equal to the ratio between the minimum available step size and the requested step size.

11. A method as claimed in claim 8, characterized by the receiving station processing the sequence of power control commands together in response to commands issued by the transmitting station and by the size of the sequence being determined.

12. A method as claimed in claim 11, characterized by the requested and available power control step sizes being predetermined.

13. A method as claimed in any one of claim 8, characterized by transmission on the channel taking place in frames and by the power control commands having a predetermined position with respect to the start of each frame.

14. A method as claimed in claim 13, characterized by the characterized by the size of the sequence being exactly divisible into the number of power control commands transmitted in a frame.

* * * * *